United States Patent
Rivera

(10) Patent No.: US 8,127,017 B2
(45) Date of Patent: Feb. 28, 2012

(54) METHODS AND SERVERS FOR DISPLAYING AND ACTIVATING DISCONNECTED SESSIONS

(75) Inventor: Juan Rivera, Doral, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 865 days.

(21) Appl. No.: 11/767,122

(22) Filed: Jun. 22, 2007

(65) Prior Publication Data

US 2008/0320145 A1 Dec. 25, 2008

(51) Int. Cl.
*G06F 15/16* (2006.01)
(52) U.S. Cl. ............ 709/227; 709/229; 715/736
(58) Field of Classification Search .......... 709/227
See application file for complete search history.

(56) References Cited

U.S. PATENT DOCUMENTS

| | | | | |
|---|---|---|---|---|
| 5,864,676 A * | 1/1999 | Beer et al. | ...... | 709/229 |
| 6,195,694 B1 * | 2/2001 | Chen et al. | ...... | 709/220 |
| 6,711,682 B1 * | 3/2004 | Capps | ...... | 713/184 |
| 7,424,543 B2 * | 9/2008 | Rice, III | ...... | 709/229 |
| 2001/0049717 A1 * | 12/2001 | Freeman et al. | ...... | 709/203 |
| 2002/0038333 A1 * | 3/2002 | Evans et al. | ...... | 709/107 |
| 2005/0080906 A1 * | 4/2005 | Pedersen | ...... | 709/228 |
| 2006/0031550 A1 * | 2/2006 | Janik et al. | ...... | 709/231 |
| 2006/0080432 A1 * | 4/2006 | Spataro et al. | ...... | 709/224 |
| 2007/0005693 A1 * | 1/2007 | Sampath et al. | ...... | 709/204 |

OTHER PUBLICATIONS

International Search Report related to International Patent Application No. PCT/US2008/066000, date of mailing Apr. 12, 2008.
Written Opinion related to International Patent Application No. PCT/US2008/066000, date of mailing Apr. 12, 2008.

\* cited by examiner

*Primary Examiner* — Patrice Winder
*Assistant Examiner* — Tauqir Hussain
(74) *Attorney, Agent, or Firm* — Foley and Lardner LLP; John D. Lanza

(57) ABSTRACT

A method for displaying and activating disconnected sessions includes the step of receiving information associated with a user. At least one disconnected session already associated with the user is identified in response to the information. A graphical representation of the at least one disconnected session associated with the user is displayed to the user. A request to connect to the at least one disconnected session is received from the user. A connection is established between a client computer operated by the user and the requested at least one disconnected session.

49 Claims, 9 Drawing Sheets

METHODS AND SERVERS FOR DISPLAYING AND ACTIVATING DISCONNECTED SESSIONS

FIELD OF THE INVENTION

The present invention relates to methods and systems for activating sessions. In particular, the present invention relates to methods and servers for displaying and activating disconnected remote application sessions and disconnected remote desktop sessions.

BACKGROUND OF THE INVENTION

Computer user behavior and the stability of network communication channels over which computers communicate are often unpredictable. Networked users on occasion change computing environments while forgetting to, or without having the opportunity to, fully save their work product or to shut down their systems. In other cases, communication channels unexpectedly fail or computers crash, which can result in the loss of work product, if the session is not restored or terminated gracefully.

Failing to gracefully cease usage of a shared network resource can lead to a variety of difficulties for networked application users. Many software applications restrict other users' ability to use shared network resources, such as data files, while a resource is in use, usually to prevent conflicting manipulation of the resource. For example, documents can be "checked out" while being edited by a user so that another user does not attempt to simultaneously edit the document, or use a stale copy of the document. If a user checks out a document while working from one computer, and then leaves the computer without subsequently "checking it in," the document can be rendered inaccessible to other users, without intervention by an administrator. And typically, upon such intervention, the changes made to the document are lost.

BRIEF SUMMARY OF THE INVENTION

In one aspect, a method for displaying and activating disconnected sessions includes the step of receiving information associated with a user. At least one disconnected session already associated with the user is identified in response to the information. A graphical representation of the at least one disconnected session associated with the user is displayed to the user. A request is received from the user to connect to the at least one disconnected session. A connection is established between a client computer operated by the user and the requested at least one disconnected session.

In one embodiment, the displayed graphical representation includes a user interface element. In another embodiment, a text-based representation is displayed to the user. In still another embodiment, a description of a state of an application executing within the at least one disconnected session is displayed to the user.

In one embodiment, a change in the at least one disconnected session is identified. In another embodiment, the graphical representation of the at least one disconnected session is updated, responsive to the identified change. In still another embodiment, the modified graphical representation is displayed to the user.

In another aspect, a method for displaying and providing remote access to previously disconnected sessions includes the step of transmitting information associated with a user. A graphical representation representing at least one previously disconnected session associated with the user is received. The received graphical representation is displayed to the user. A request to connect to the at least one previously disconnected session is transmitted. Output data generated by the at least one previously disconnected session associated with the user is received in response to the transmitted request.

In one embodiment, a request is made, after a time interval, for an identification of a change in the at least one previously disconnected session associated with the user.

In another embodiment, the graphical representation is modified responsive to receiving an identification of a change in output data generated in the at least one previously disconnected session. In still another embodiment, the modified graphical representation is displayed to the user.

In still another aspect, a server for displaying and activating disconnected sessions includes a network module, a data store, and a server process. The network module receives information associated with a user of a client computer. The data store enumerates at least one disconnected session associated with the user. The server process transmits, to the client computer, a graphical representation of the at least one disconnected session associated with the user. The server process receives a request to connect to the at least one disconnected session. The server process connects the client computer to the requested at least one disconnected session enumerated in the data store.

In one embodiment, the server process transmits a graphical representation of the at least one session associated with the user, the graphical representation comprising a user interface element. In another embodiment, the server process transmits a representation of a state of the at least one disconnected session associated with the user. In still another embodiment, the server process transmits a description of a state of the at least one disconnected session associated with the user. In yet another embodiment, the server process transmits a text-based description of a state of the at least one disconnected session associated with the user. In some embodiments, the server process transmits, to a client computer, output data generated by the at least one disconnected session. In one of these embodiments, the client computer generates a graphical representation of the generated output data.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
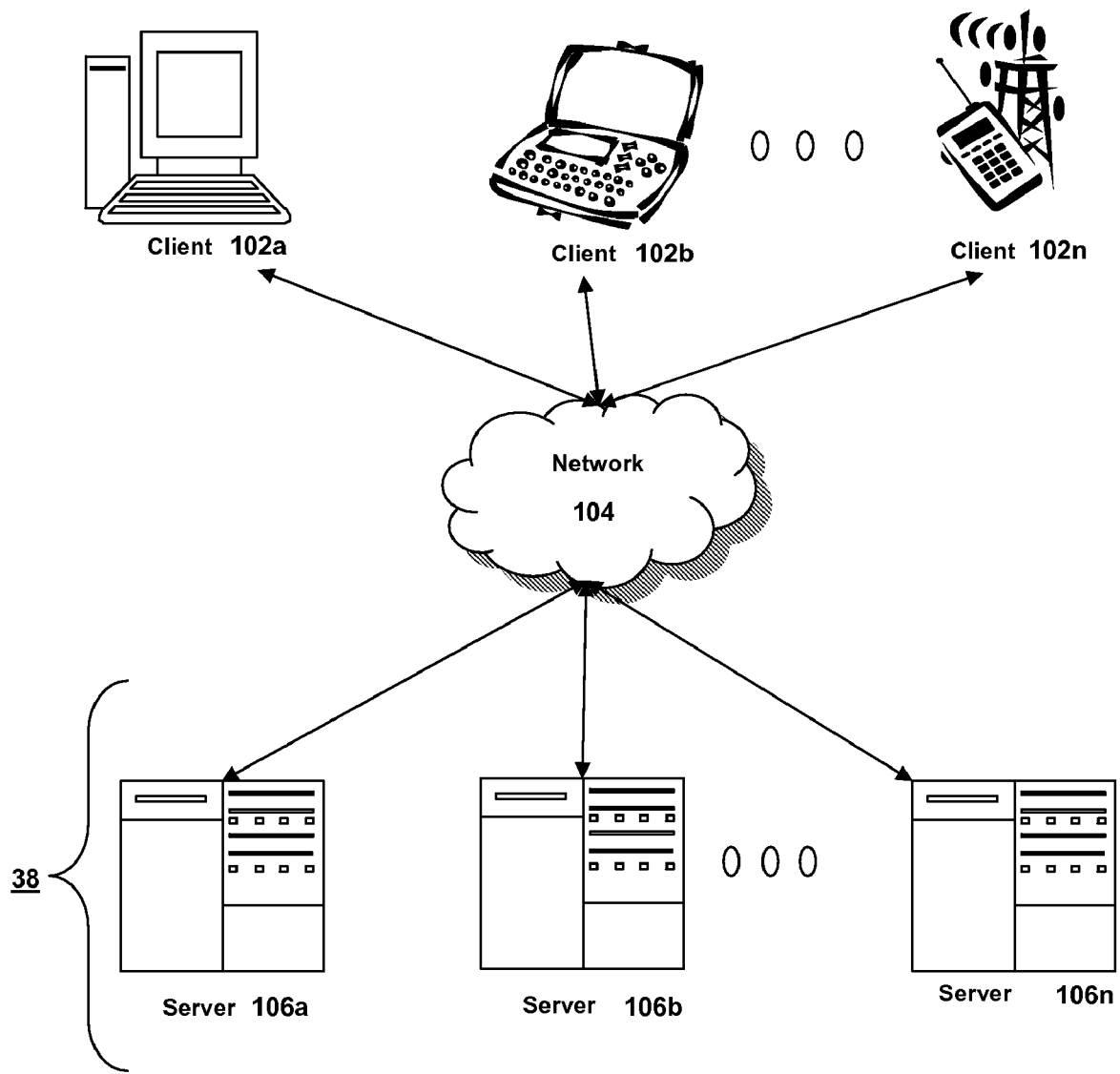
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The remote machine 30 may be an application acceleration appliance. For embodiments in which the remote machine 30 is an application acceleration appliance, the remote machine 30 may provide functionality including firewall functionality, application firewall functionality, or load balancing functionality. In some embodiments, the remote machine 30 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output data of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output data to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
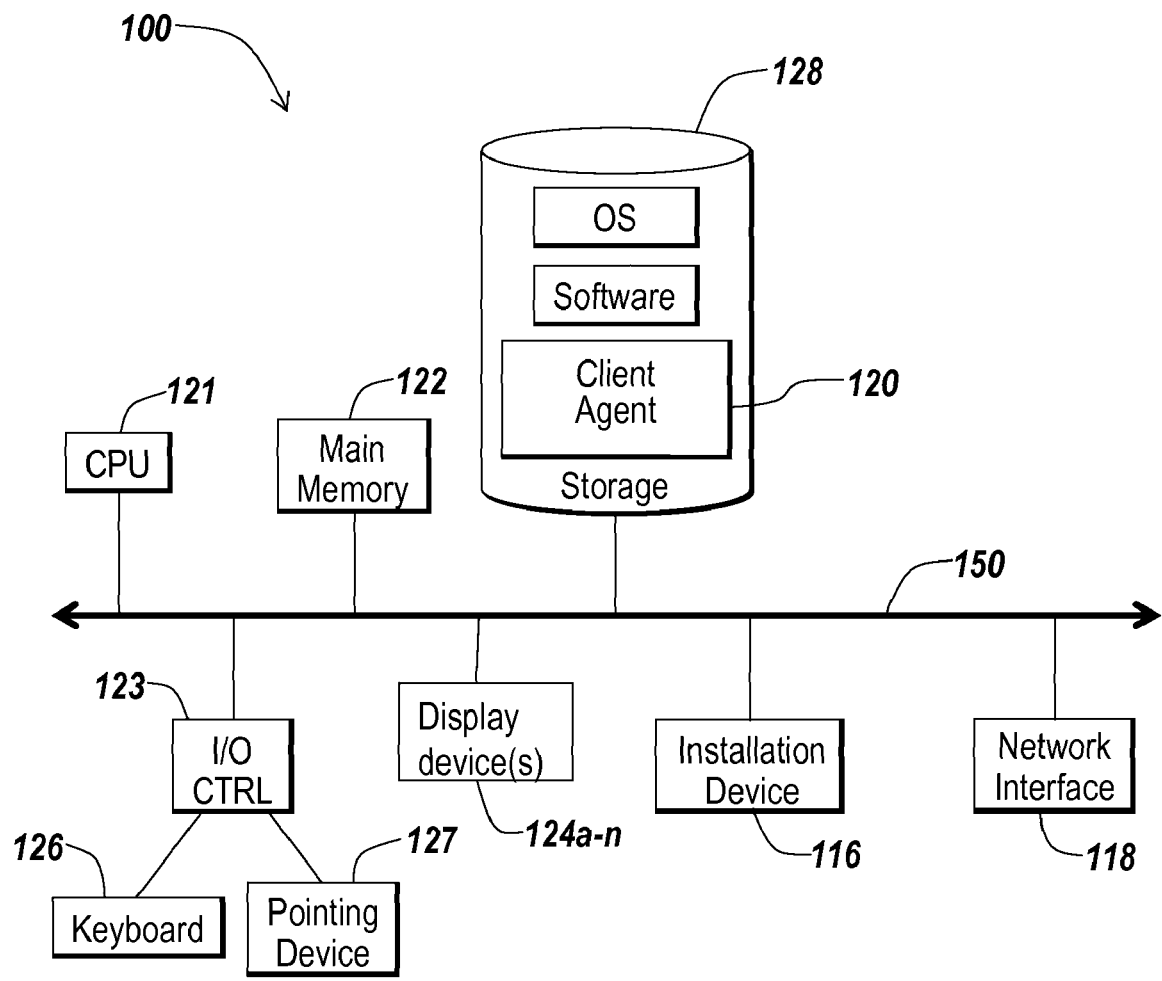
FIGS. 1B and 1C are block diagrams depicting embodiments of computers useful in connection with the methods and systems described herein.
Figure 1C:
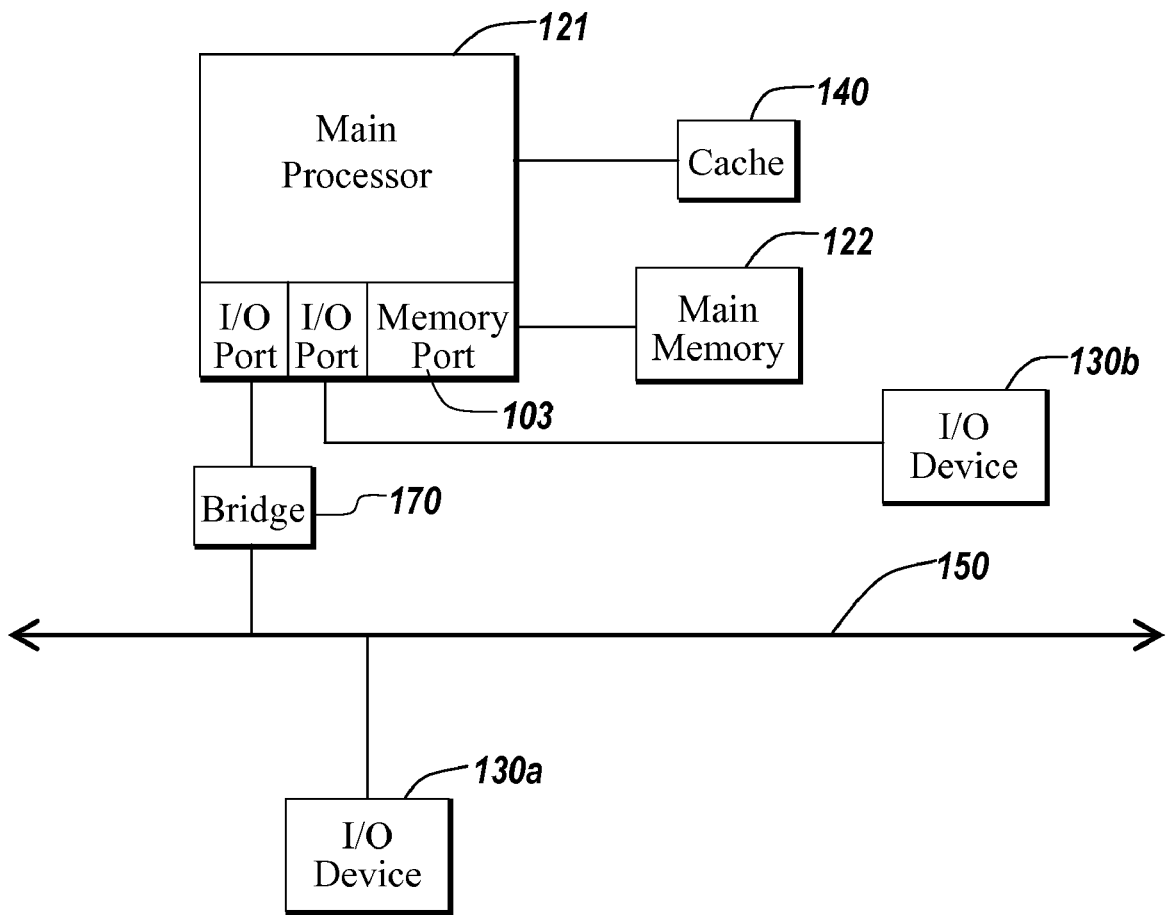

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130*a* using a local interconnect bus while communicating with I/O device 130*b* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

In some embodiments, the computing device 100 may have different processors, operating systems, and input devices consistent with the device. For example, in one embodiment, the computing device 100 is a Treo 180, 270, 600, 650, 680, 700p, 700w, or 750 smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

Figure 2A:
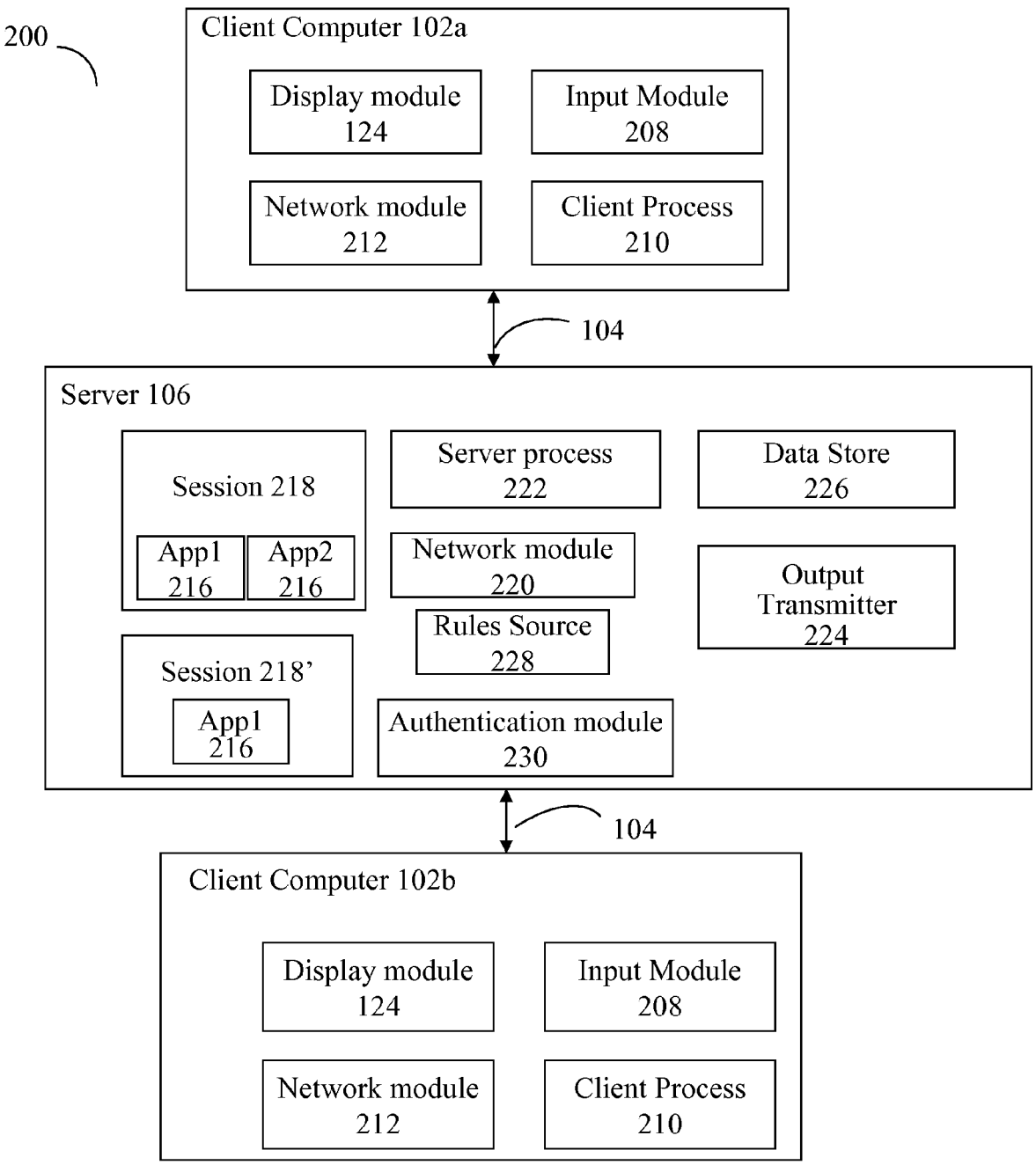
FIG. 2A is a block diagram depicting one embodiment of a server for displaying and activating disconnected sessions.
Figure 2B:
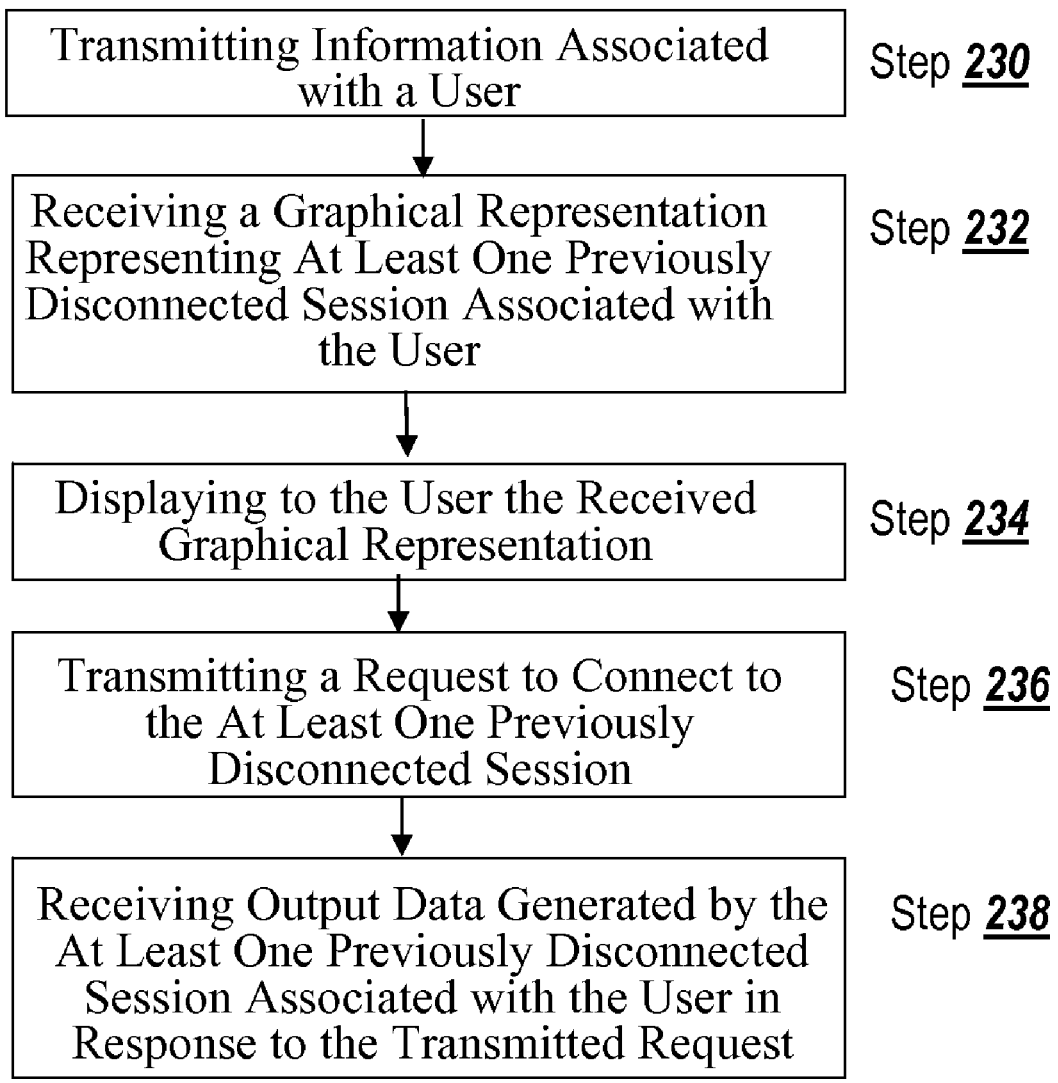
FIG. 2B is a flow diagram depicting an embodiments of the steps taken in a method for receiving output data generated by the at least one previously disconnected session.

FIGS. 2A, 2B, 2C, and 2D depict various embodiments of a client-server system for displaying and activating disconnected sessions. In FIG. 2A, a block diagram depicts a client-server computer system 200 including a first client computer 102a, a second client computer 102b, and a server 106. In one embodiment, the first client computer 102a includes an input module 208, a client process 210, a network module 212, and a display module 224. The input module 208 provides an interface for a user of the first client computer 102a to interact with the first client computer 102a, for example, to request the remote execution of an application 216 in a session 218 from the server 106. In FIG. 2B, a flow diagram depicts one embodiment of the steps taken in a method for displaying and providing remote access to previously disconnected sessions. Information associated with a user is transmitted (step 230). A graphical representation representing at least one previously disconnected session associated with the user is received (step 232). The received graphical representation is displayed to the user (step 234). A request to connect to the at least one previously disconnected session is transmitted (step 236). Output data generated by the at least one previously disconnected session associated with the user is received in response to the transmitted request (step 238).

Figure 2C:
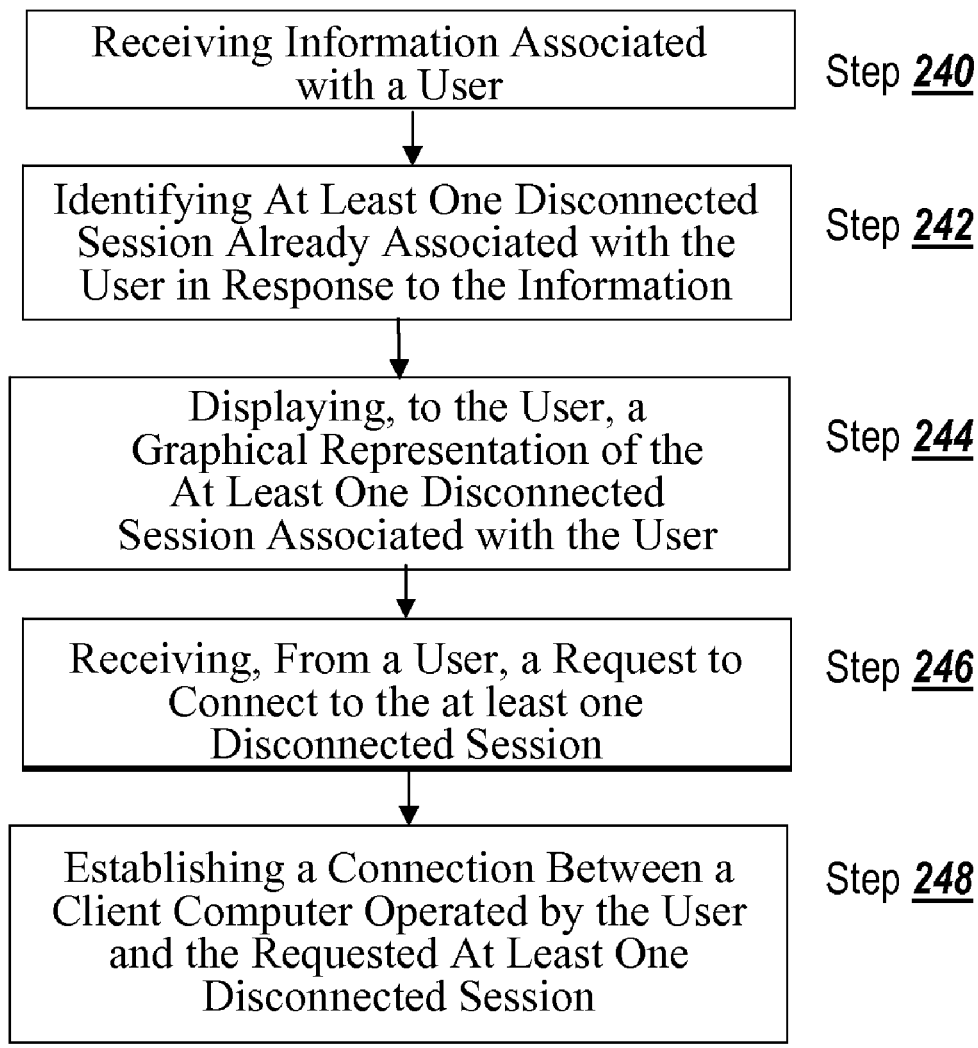
FIG. 2C is a flow diagram depicting one embodiment of the steps taken in a method for displaying and activating disconnected sessions.
Figure 2D:
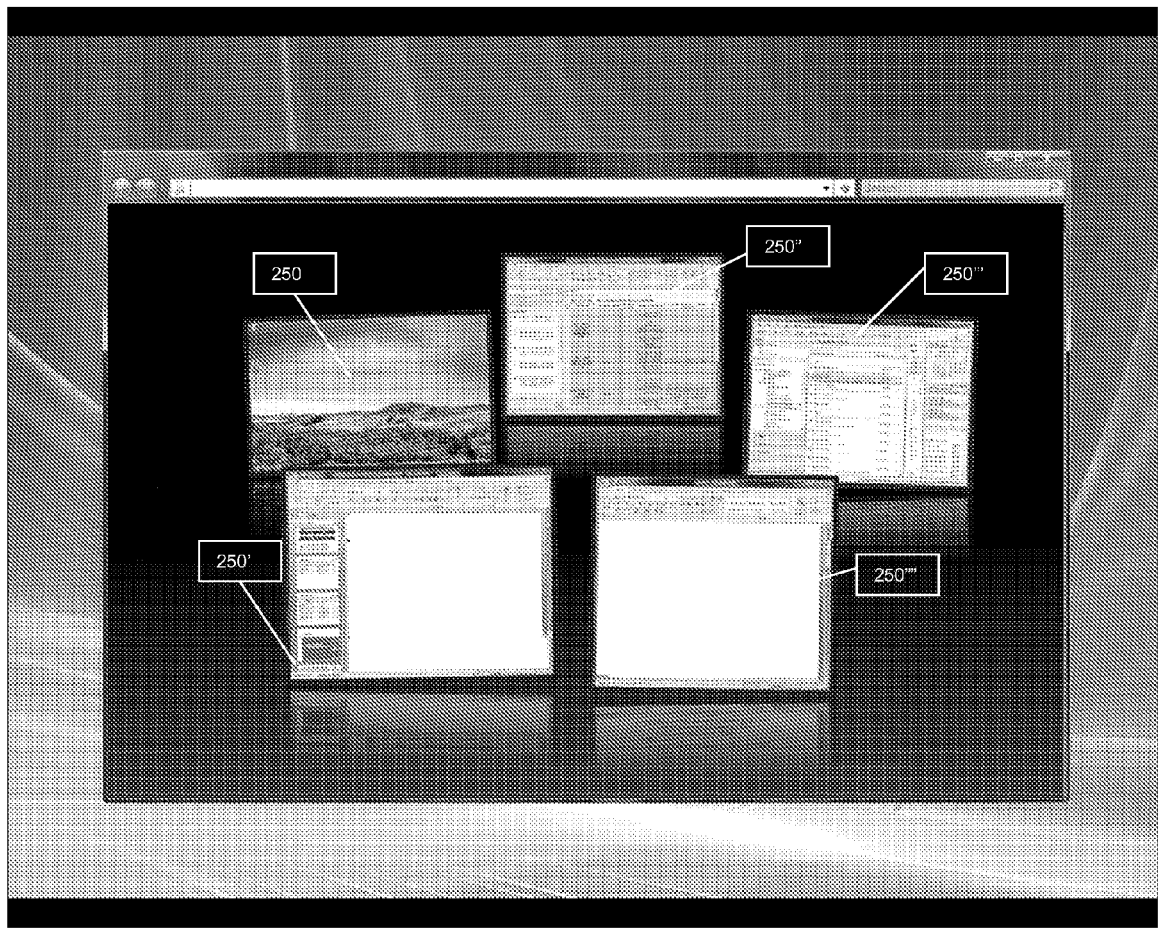
FIG. 2D is a screen shot depicting an embodiment of graphical representations of disconnected sessions associated with a user.

In FIG. 2C, a flow diagram depicts one embodiment of the steps taken in a method for displaying and activating disconnected sessions. The method includes the step of receiving authentication information associated with a user (step 240). At least one disconnected session already associated with the user is identified in response to the information (step 242). A graphical representation of the at least one disconnected session associated with the user is displayed to the user (step 244). A request is received, from the user, to connect to the at least one disconnected session (step 246). A connection is established between a client computer operated by the user and the requested at least one disconnected session (step 248). In FIG. 2D, a screen shot depicts one embodiment of a graphical representation of a disconnected session associated with a user.

Referring now to FIG. 2A, a server 106 for displaying and activating disconnected sessions includes a network module 220, a data store 226, and a server process 222. The network module 220 receives authentication information associated with a user of a client computer 102. The data store 226 enumerates at least one disconnected session associated with the user. The server process 222 transmits, to the client 102, a graphical representation of the at least one disconnected session associated with the user. The server process 222 receives a request to connect to the at least one disconnected session. The server process 222 connects the client 102 to the requested at least one disconnected session enumerated in the data store 226.

In one embodiment, a session 218 is a process, operating on the server 106, that supports the execution of one or more applications 216. In some embodiments, execution of a session 218 includes execution of a desktop application 216 from which the execution of other applications 216 can be initiated. In other embodiments, a session 218 is a session between a client machine 102 and a hosted desktop provided by a virtual machine executing on a server 106. In one of these embodiments, a desktop session 218' executes within the session 218. In another of these embodiments, one or more applications 216 execute within a desktop session 218' executing within the session 218. In still other embodiments, a session 218' may execute within a second session 218. In one of these embodiments, for example, a virtual machine on a server 106 executes a session 218 and a second session 218'—such as a desktop session within which a plurality of applications 216 executes—executes within the session 218. In yet another embodiment, the session 218 includes an instance of the execution of a single application 216.

In one embodiment, the input module 208 is, for example, a graphical user interface that provides one or more icons or menu selections for a user to select. In another embodiment, at least one icon or menu selection represents a specific application 216 available for remote execution. In still another embodiment, selecting an icon or menu selection initiates the transmittal of a log-on request to the server 106 for access to that application 216. In still even another embodiment, an icon or menu selection does not represent any specific application 216, but instead represents a general server 106 log-on procedure. In yet another embodiment, the input module 108 is non-graphical user interface. In this embodiment, the user can enter a command to send a log-on request to server 106. Entering a command can include typing a predefined set of characters or depressing a specified key sequence on an input device (e.g., a keyboard or keypad). In one embodiment, the log-on request includes user-provided authentication information. In another embodiment, the input module 208 accepts the input of the user-provided authentication information, which can include any type of authentication information, including, without limitation, any of user name-password/PIN combinations, voice samples, one-time passcodes, biometric data, digital certificates, or smart card data. In some embodiments, the input module 208 is in communication with additional hardware peripherals to facilitate acceptance of user authentication information.

Referring now to FIG. 2A, and also in connection with FIG. 2B and FIG. 2C, information associated with a user is transmitted (step 230, FIG. 2B) and the information associated with a user is received (step 240, FIG. 2C). In one embodiment, the input module 208 accepts authentication information and provides it to the client process 210. In another embodiment, the client process 210 manages the client-side functionality of the remotely-executing session. In still another embodiment, the client process 210 forwards user input including the authentication information and requests for termination or disconnection of sessions 218 to the server 106. In still even another embodiment, the server 106 receives the information associated with a user of a client computer 102 and authenticates the user responsive to the information. In yet another embodiment, the client process 210 processes data received from the server 106, for example, by forwarding graphical output data generated in a session 218, or a graphical representation of output data from a session 218, to the display module 224.

The network module 212 provides for communication between a client computer 102 and the server 106. The network module 220 provides communication functionality for the server 106. In one embodiment, the network module 212 sends user input, such as authentication information and requests for access to, disconnection from, or termination of sessions 218 executing on the server 106. In another embodiment, the network module 212 also receives output data from the sessions 218 and forwards the output data to the client process 210. In still another embodiment, the network module 212 encapsulates user input into, and reconstitutes session output data from, a predetermined protocol for transmission to the server 106. In yet another embodiment, the network module 212 encrypts outgoing transmissions and decrypts incoming transmissions.

In some embodiments, the network module 220 receives authentication information associated with a user of a client computer 102. In another embodiment, the network module 220 receives communications from first and second client computers 102a and 102b over one or more data networks or links 221. In still another embodiment, the network module 220 transmits output data to the client computer 102. In still even another embodiment, the network module 220 encrypts outgoing communications and decrypts incoming communications. In one embodiment, the network module 220 of the server 106 communicates with the network module 212 of a client computer 102 over a network 104. In another embodiment, incoming communications, once decrypted or retrieved from a protocol (if necessary), are forwarded to a session 218 or to the server process 222, as appropriate.

In some embodiments, the network module 220 encapsulates outgoing communications in a protocol for transmission and retrieves incoming data from transmissions received according to a communications protocol. In one of these embodiments, network module 220 uses at least one communication protocol to encapsulate data. In another of these embodiments, a first communication protocol, capable of encapsulating secondary protocols used in communications between the client and the host service, ensures that data is maintained during a disrupted network connection. In still another of these embodiments, data communicated between the client and the host service is buffered. When, for example, a client, such as a mobile client, roams between different access points in the same network, the buffered data is maintained during the temporarily disrupted network connection. Similarly, in another example, when a client switches between networks (e.g., from a wired network to a wireless network) the buffered data is maintained during the temporarily disrupted connection to the host service. In still even another of these embodiments, buffered data can also be maintained, for example, when the network connection is disrupted due to a failure of a server side component (e.g., a failure of a server side proxy), due to a time-out in the system, or due to other reasons. In yet another of these embodiments, the network module 220 provides session persistence and reliability by encapsulating secondary protocols within the first communication protocol.

In one embodiment, at least one previously disconnected application session already associated with the user is identified responsive to the authentication information. In another embodiment, at least one previously disconnected desktop session already associated with the user is identified responsive to the authentication information. In some embodiments, the client computer 102 receives output data generated by the at least one previously disconnected session. In one of these embodiments, an application executing within the at least one previously disconnected session generates the output data. In another of these embodiments, the client computer 102 generates a graphical representation of the at least one previously disconnected session using the received output data. In still another of these embodiments, the client computer 102 receives a graphical representation of the output data.

A graphical representation representing at least one previously disconnected session associated with the user is received (step 232, FIG. 2B). The received graphical representation is displayed to the user (step 234, FIG. 2B). In one embodiment, the display module 224 displays the graphical representation of the at least one previously disconnected session to a user of the client computer 102. In some embodiments, output data is displayed to the user. In other embodiments, a graphical user interface is displayed to the user with the received graphical representation. In still other embodiments, the received graphical representation incorporates a graphical user interface element. In yet other embodiments, a text-based representation of output data generated by a disconnected session is displayed to the user.

In one embodiment, the display module 224 displays the output data generated by an application 216 or a session 218 from a remotely-executing session 218. In another embodiment, the display module 224 forwards output data received from the client process 210 directly to a display device, such as the display device 124 described above in connection with FIGS. 1B and 1C, or other suitable form of display device. In some embodiments, the received output data is encrypted, encapsulated in a protocol, or both. In one of these embodiments, the display module 224 first manipulates the output data so that the output data can be interpreted by a standard display adapter such as a computer video card.

A request to connect to the at least one previously disconnected session is transmitted (step 236, FIG. 2C). In one embodiment, a user of the client computer 102 selects a graphical representation to which to connect. In another embodiment, the client computer 102 transmits the request to connect responsive to selection of a corresponding graphical representation selected by a user. Output data generated by the at least one previously disconnected session associated with the user is received in response to the transmitted request (step 238, FIG. 2C). The output data generated by the session, and by applications executing within the session, are received and displayed as described below.

The server process 222 manages the execution and termination of sessions 218 and the connections and disconnections of those sessions 218 to the client computer 102. In one embodiment, the server process 222 can initiate new sessions 218, disconnect a client computer 102 from a session 218, detect a client computer 102 disconnection from a session 218, locate a session 218 from which a user has disconnected, locate a session 218 to which a user of a first client computer 102a is connected to from a second client computer 102b, receive a request to connect to a disconnected session, and connect a user to a disconnected session 218. In another embodiment, the sessions 218 are configured with a user's personal preferences and authorization privileges.

The output transmitter 224 transmits output data from a session 218 to a client computer 102 through the network module 220. In one embodiment, the output transmitter 224 intercepts the output data generated in a session 218 and determines which client computer 102 is connected to the session 218. If the session 218 is connected to a client computer 102, the output transmitter 224 transmits the output data to the connected client via the network module 220. In one embodiment, if the session 218 is not connected to a client 102, the output transmitter 224 discards the output data and waits to receive future output data. In another embodiment, if the session 218 is not connected to a client 102, the output transmitter 224 disregards all further output data until the output transmitter 224 receives notification that a session 218 has connected to a client computer 102. In some embodiments, as described in further detail below, if the sessions 218 are not connected to a client 102, the output transmitter 224 transmits, to a client computer 102, a graphical representation of at least one disconnected session associated with the user.

In one embodiment, the output transmitter 224 stores the data until the output transmitter 224 receives notification that the session 218 has connected to a client computer 102. In another embodiment, the output transmitter 224 attempts to send output data to a client computer 102 until the server process 222 notifies the output transmitter 224 that the client computer 102 is disconnected from the server 106. In still another embodiment, the output transmitter 224 determines which client computer 102a or 102b, if any, the session 218 is connected to by consulting the data store 226. In yet another embodiment, the server process 222 determines to which client computer 102, if any, the session 218 is connected by consulting the data store 226 and transmits the determination to the output transmitter 224.

At least one disconnected session already associated with the user is identified in response to the information (step 242, FIG. 2C). In one embodiment, the at least one disconnected session already associated with the user continues to execute at least one application. In another embodiment, the at least one disconnected session already associated with the user continues to execute a desktop session. In still another embodiment, a server 106 identifies the at least one disconnected session.

In one embodiment, a first session executing on a first server is identified. In some embodiments, a second session executing on a second server is identified. In one of these embodiments, one of the first session and the second session is identified as a disconnected session. In other embodiments, a second session executing on the first server is identified. In one of these embodiments, one of the first session and the second session is identified as a disconnected session.

The data store 226 includes information related to sessions 218 initiated by users. In one embodiment, the data store 226 is stored in volatile or non-volatile memory. In another embodiment, the data store 226 is distributed through multiple servers. Table 1 shows the data included in a portion of an illustrative data store 226.

TABLE 1

| | Session | | |
| --- | --- | --- | --- |
| | Session 1 | Session 2 | Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative data store 226 in Table 1 includes data associating each session 218 with the user that initiated the session 218, an identification of the client computer 102a or 102b, if any, from which the user is currently connected to the server 106, and the internet protocol (IP) address of that client computer 102a or 102b. The illustrative data store 226 also includes the status of each session. A session 218 status can be, for example, "active" (meaning a user is connected to the session 218), or "disconnected" (meaning a user is not connected to the session 218). In another embodiment, a session status can also be set to "executing-disconnected" (meaning the user has disconnected from the session 218, but applications in the session 218 are still executing), or "stalled-disconnected" (meaning the user is disconnected and applications 216 in the session 218 are not executing, but their operational state immediately prior to the disconnection has been stored). The data store 226 further stores information indicating the applications 216 that are executing within each session 218 and data indicating a process associated with each application 216. In one embodiment, where the server 106 resides in a server farm, the data store 226 also includes the data in the last two rows of Table 1 that indicate on which server in the server farm each application 216 is or was executing, and the IP address of that server. In other embodiments, the data store 226 includes a status indicator for each application 216 in each session 218.

For example, and referring to Table 1, three sessions 218 exist, Session 1, Session 2, and Session 3. Session 1 is associated with User 1, who is currently using terminal 1. Terminal one's IP address is 172.16.2.50. The status of Session 1 is active, and in Session 1, a word processing program is being executed on Server A as process number 1. Server A's IP address is 172.16.2.55. Session 2 in Table 1 is an example of a disconnected session 218. Session 2 is associated with User 2, but Session 2 is not connected to a client computer 102. Session 2 includes a database program that is executing on Server A, at IP address 172.16.2.55 as process number 3. Session 3 is an example of how a user can interact with sessions 218 operating on different servers 106. Session 3 is associated with User 1, as is Session 1. Session 3 includes a spreadsheet program that is executing on Server B at IP address 172.16.2.56 as process number 2, whereas the session 218 included in App Session 1 is executing on Server A.

In one embodiment, the server 106 also includes a rules source 228. In another embodiment, the rules source 228 stores rules specifying a policy applicable to a user requesting access to a session 218, or to an application 216 in a session 218. In still another embodiment, the rules stored in the rules source 228 are specified at least in part by the system administrator. In still even another embodiment, a user specifies at least some of the rules stored in the rules source 228. In this embodiment, the user-specified rule(s) may be referred to as preferences. In yet another embodiment, the rules source 228 can be stored in volatile or non-volatile memory or distributed through multiple servers.

In one embodiment, a rule stored in the rule source 228, for example, might require or forbid automatic connection to disconnected sessions 218. In another embodiment, a rule might require or forbid automatic connection to active sessions 218 currently connected to a different client computer 102. In still another embodiment, a rule might make a connection contingent on the client computer 102 residing within a secure network. In still even another embodiment, a rule might only allow connection to sessions 218 after receiving user approval. In still another embodiment, a rule might only allow connection for a predetermined time after disconnection. In yet another embodiment, a rule may only allow connection to sessions 218 that provide access to specific applications 216.

In some embodiments, the authentication module 230 authenticates a user that attempts to log on to the server 106. In one embodiment, the authentication module 230 receives user-provided authentication information transmitted from the first client computer 102a. In another embodiment, the authentication module 230 authenticates the user based on user-provided authentication information. In yet another embodiment, the authentication module 230 transmits, responsive to a successful authentication, the results of the authentication process (e.g., allow or deny access, the user's system ID, client computer ID, user access permissions, etc.) to the server process 222.

Unintentional termination of sessions 218 resulting from imperfect network connections or users' failure to terminate their sessions 218 themselves can lead to user difficulties. In one embodiment, these difficulties are addressed by differentiating disconnection (which is treated as if the user is not done working with a session 218) from termination (which is assumed to be an intentional completion of the session) and by correlating sessions 218 with users as opposed to correlating sessions with client computers. In some embodiments, when a user is finished executing an application 216 operating in a session 218, the user can terminate a session 218. In one of these embodiments, termination generally involves the affirmative input of the user indicating that the server should no longer maintain the session 218. In another of these embodiments, affirmative user input can include selecting an "Exit" option from a menu, clicking on an icon, or entering a termination command into a command-line interface. In still another of these embodiments, in response to receiving a termination request, the server process 222 terminates the execution of the session 218 and of any application 216 within that session 218 is halted. In another of these embodiments, data related to the session 218 is also removed from the data store 226.

In other embodiments, disconnection, either intentional or unintentional does not result in termination of sessions 218. In one of these embodiments, the application or applications operating in a session 218 are executing on the server 106 and a connection to the client computer 102a is not usually necessary to continue execution of the applications 216. In another of these embodiments, the applications 216 continue to execute while waiting for a user to connect to the session 218. In still another of these embodiments, upon disconnection of a user, the server process 222 stalls the execution of the applications 216 operating in the session 218. In this embodiment, the server process 222 halts further execution of the applications 216, and the server process 222 stores the operational state of the application 216 and any data the application 216 is processing. In still even another of these embodiments, the server process 222 can selectively stall execution of specific applications 216 after a user disconnects. For example, and in one embodiment, the server continues execution of an application 216 for a fixed time period, and if a user fails to connect within that time period, the server process 222 stalls the application 216. In yet another of these embodiments, the server process 222 stalls specified sessions 218 that cannot continue executing without user input. In other embodiments, the server process 222 updates a data record associated with the application 216 or with the session 218 to include an identification of the status of the application or session.

In some embodiments, the server process 222 continues execution of the application 216 while the session 218 remains disconnected from the client computer 102. In other embodiments, if the user of a client computer 102 disconnects from the server 106 and then connects to the server 106 while operating the first client computer 102a, the second client computer 102b, or a third client computer 102n, the server process 222 can connect the client computer 102 operated by the user to one or more previously initiated, non-terminated session(s) 218 associated with the user, and reinitiate execution of any stalled applications 216.

In one embodiment, the server process 222 detects a disconnection. A user can intentionally and manually instruct the server to disconnect a session 218 from the client computer 102. For example, in one embodiment, sessions 218 provide a menu option for disconnection (as distinguished from termination above) that a user can select. The server process 222 can also detect an unintentional disconnection. For example, in one embodiment, the network module 220 of the server 106 informs the server process 222 when a predetermined number of data packets transmitted by the network module 220 to a client computer 102 have not been acknowledged by the client computer 102. In another embodiment, the client computer 102 periodically transmits a signal to the server 106 to confirm that a connection is still intact. If the server process 222 detects that a predetermined number of expected confirmation signals from a client computer 102 have not arrived, the server process 222 determines that the client computer 102 has disconnected. If the server process 222 detects that a user has disconnected from a session 218, either intentionally, or unintentionally, the entry in the data store 226 related to the disconnected session 218 is modified to reflect the disconnection.

A graphical representation of the at least one disconnected session associated with the user is displayed to the user (step 244, FIG. 2C). The server process 222 transmits, to the client 102, a graphical representation of the at least one disconnected session associated with the user. In one embodiment, the graphical representation displays a representation of output data generated by an executing, disconnected session. In another embodiment, the graphical representation displays a representation of output data generated by an application executing in a disconnected session. In still another embodiment, the server process 222 transmits, to a client computer 102, output data generated by an executing, disconnected session. In still even another embodiment, the client computer 102 displays, to the user, a graphical representation of the output data. In yet another embodiment, the server process 222 transmits, to the client computer 102, a graphical representation comprising a user interface element. In some embodiments, an output transmitter 224 transmits, to the client computer 102, the output data generated by an executing, disconnected session.

In one embodiment, the server process 222 transmits, to the client computer 102, a representation of a state of the at least one disconnected session associated with the user. In another embodiment, the server process 222 transmits, to the client computer 102, a description of a state of the at least one disconnected session associated with the user. In still another embodiment, the server process 222 transmits, to the client computer 102, a text-based description of a state of the at least one disconnected session associated with the user.

In some embodiments, the server process 222 transmits, to the client computer 102 output data generated in the at least one disconnected session. In one of these embodiments, the client computer 102 generates the representation, graphical or text-based, of the output data received from the at least one disconnected session. In another of these embodiments, the client computer 102 displays the output data as described above. In still another of these embodiments, the client computer 102 displays the representation of the output data in a window generated by an internet browser application. In yet another of these embodiments, the client computer 102 replaces an existing representation of output data with an updated version of the representation. In some embodiments, the representation of the output data is graphical. In other embodiments, the representation of the output data is text-based.

In some embodiments, a graphical representation 250 may depict the output of multiple applications executing within a disconnected session 218. In one of these embodiments, the graphical representation 250 depicts the output of multiple applications executing from a desktop application, which is provided by a session 218. In other embodiments, a plurality of graphical representations 250 is displayed to the user of the client computer 102. In one of these embodiments, a first graphical representation 250 in the plurality of graphical representations depicts a first type of session 218 and a second graphical representation 250' in the plurality of graphical representations depicts a second type of session 218. For example, the first graphical representation 250 may depict the application-output data generated by a single application executing in a session 218, while the second graphical representation 250' may depict the output data generated by a plurality of applications executing within a hosted desktop session 218'. In still other embodiments, a single graphical representation 250 is depicted.

Referring now to FIG. 2D, a screen shot depicts one embodiment of a graphical representation of a disconnected session associated with a user. FIG. 2D depicts a plurality of graphical representations 250, 250', 250", 250''', and 250''''. Each graphical representation depicts the output of a disconnected session 218 associated with the user. Graphical representation 250 depicts the output of a disconnected session 218 in which a desktop session executes. Graphical representation 250', 250", and 250'''' depict the output of disconnected sessions 218 in which office productivity applications execute (a presentation preparation application, a word processing application, and a spreadsheet application, respectively). Graphical representation 250''' depicts the output of a disconnected session 218 in which an electronic mail client executes.

Referring back to FIG. 2A and FIG. 2C, and in some embodiments, the server process 222 identifies a change in the at least one disconnected session associated with the user and transmits a modified version of the at least one disconnected graphical representation of the at least one session displayed to the user, responsive to the identified change. In one of these embodiments, the server process 222 requests an identification of a change in the at least one disconnected session. In another of these embodiments, the server process 222 requests the identification of the change from a server executing the session 218. In still another of these embodiments, the server process 222 requests, after a time interval, an identification of a second change in the at least one session associated with the user. In still even another of these embodiments, the server process 222 polls a server executing the session 218 for changes in the at least one application session. In yet another of these embodiments, the server process 222 updates, after a time interval, the graphical representation of the at least one application session displayed to the user, responsive to an identification of a second change in the at least one application session associated with the user.

In other embodiments, the server process 222 queries the data store 226 to determine that a previously connected session has become disconnected from a client computer 102. In one of these embodiments, the server process 222 instructs the output transmitter 224 to transmit, to the client computer 102, the output data generated by the session 218 prior to the disconnection.

In some embodiments, the server process 222 receives a request for the identification of the change. In one of these embodiments, the server process 222 receives the request from the client computer 102. In another of these embodiments, the server process 222 transmits the identification of the change to the client computer 102. In other embodiments, the server process 222 transmits, to the client computer 102, an updated graphical representation of the at least one session, responsive to an identification of a change in the at least one session associated. In still other embodiments, the server process 222 transmits, to the client computer 102, output data generated in the session 218. In one of these embodiments, the client computer 102 generates the graphical representation of the output data and displays the graphical representation to the user.

In some embodiments, the client computer 102 requests, from the server 106, the identification of a change in the at least one previously disconnected session associated with the user. In other embodiments, the client computer 102 requests, from a server 106', which executes the at least one previously disconnected session, the identification of a change in the at least one previously disconnected session associated with the user. In still other embodiments, the client computer 102 requests, after a time interval, an identification of a change in the at least one previously disconnected session associated with the user. In still even other embodiments, the client computer 102 polls a server for an identification of a change in the at least one previously disconnected session associated with the user.

In some embodiments, the client computer 102 receives an identification of a change in the at least one previously disconnected session. In other embodiments, the client computer 102 receives output data generated by a session during a time interval. In still other embodiments, the client computer 102 receives a modified version of the graphical representation. In yet other embodiments, the client computer 102 displays a modified version of the graphical representation.

Figure 3A:
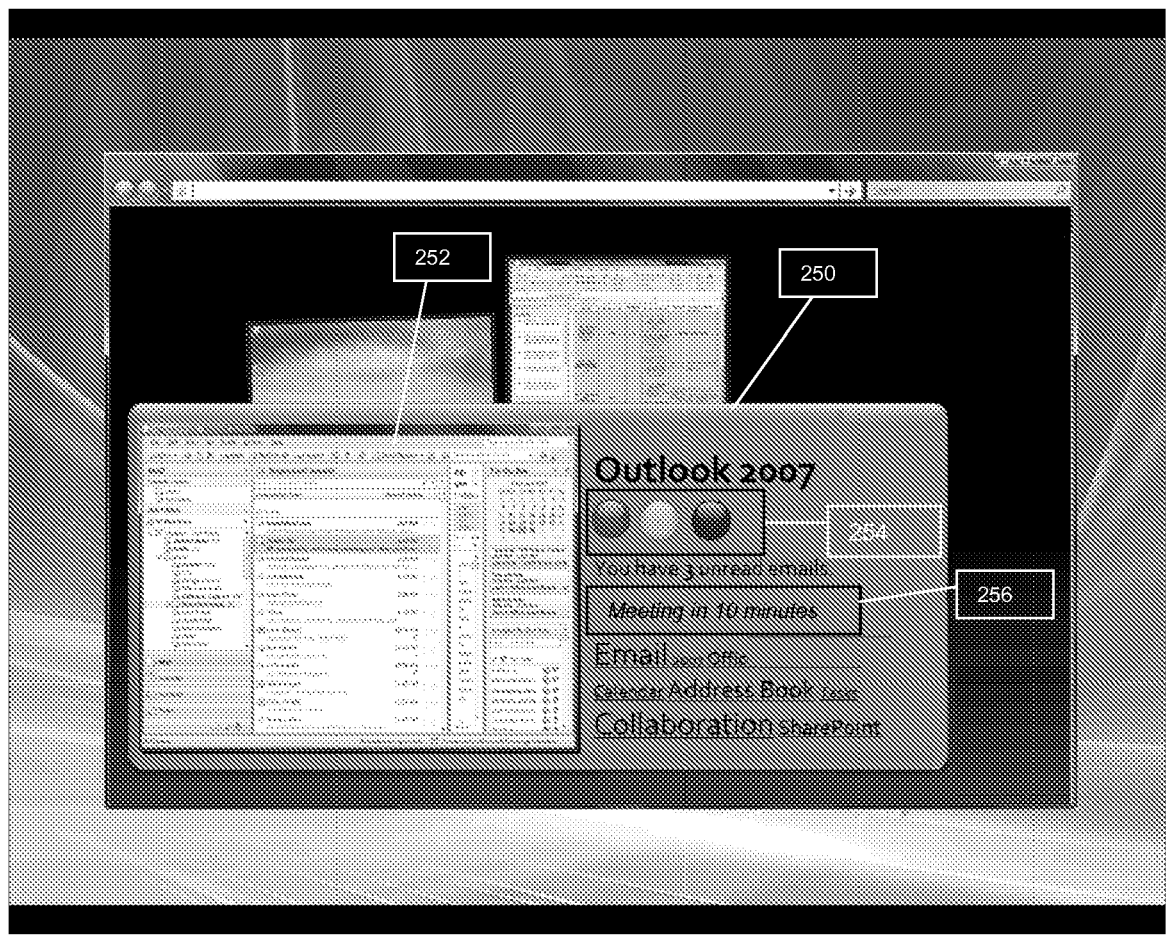
FIGS. 3A and 3B are screen shots depicting an embodiment of a graphical user interface updated to reflect a change in a state of a disconnected session.

Referring ahead to FIG. 3A, a screen shot depicts an embodiment of a graphical user interface updated to reflect a change in a state of a disconnected session. The graphical representation 250 includes a representation 252 of output data generated by an executing application in a session 218 and a user interface element 254 as described above in connection with FIG. 2D. In FIG. 3A, however, the state of the disconnected session has changed to include output data representing a meeting reminder generated by an application executing in the session 218. As shown in FIG. 3A, the client computer 102 displays an updated version of the graphical representation 250 to include a text-based representation 256 of the output data generated by the session 218.

Figure 3B:
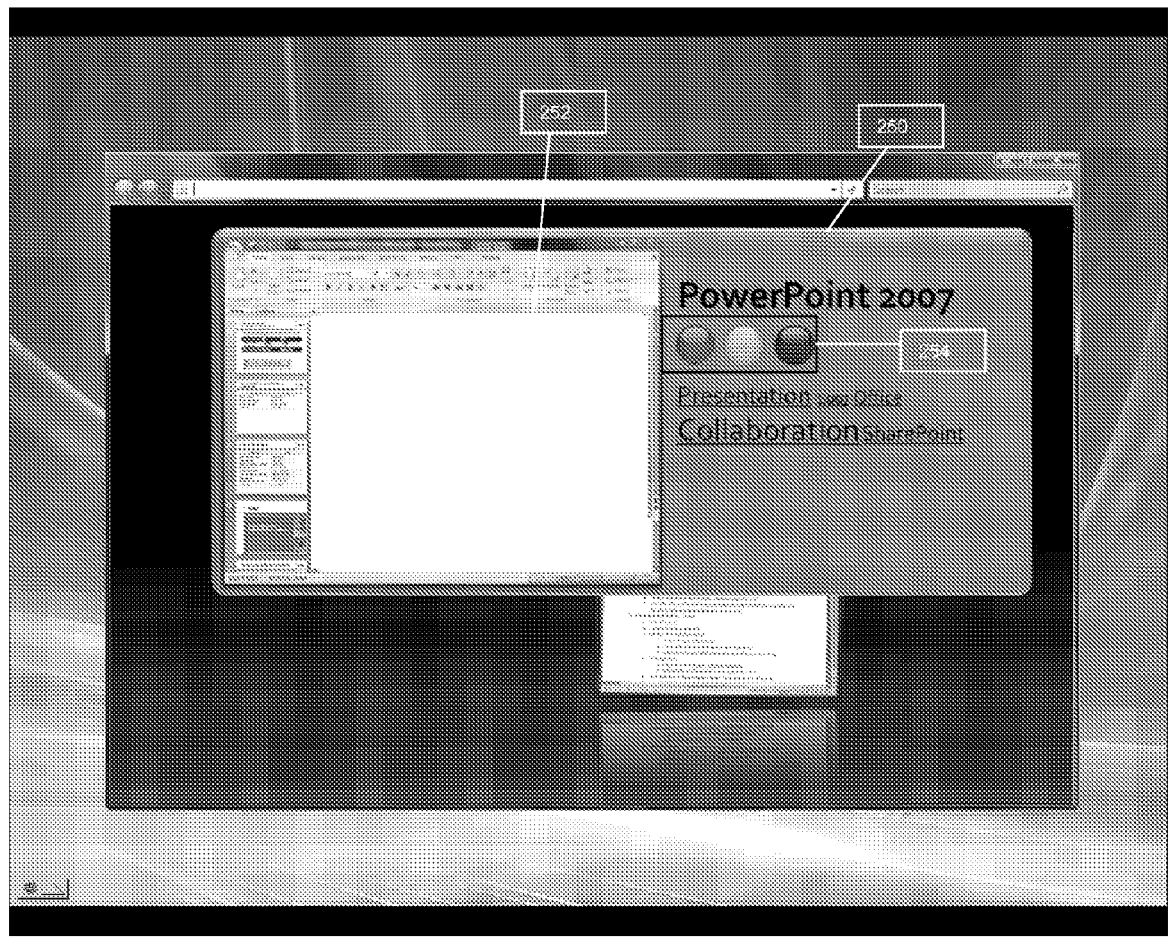

Referring ahead to FIG. 3B, a screen shot depicts an embodiment of a graphical representation of a disconnected session associated with a user. In this embodiment, a graphical representation 250 includes a representation 252 of the output data of a disconnected session 218 and a user interface element 254. The output data of the disconnected session 218 depicts the output data of a word processing document. The user may select a user interface elements 254 to request connection to an executing application in a disconnected session 218, to request a disconnection from a session 218, or to request termination of an executing application in a disconnected session 218. In some embodiments, the representation 252 is also a user interface element. In one of these embodiments, the user may request execution of the represented application or session by selecting the representation 252.

Referring back to FIG. 2C, a request is received, from the user, to connect to the at least one disconnected session (step 246, FIG. 2C). The server process 222 receives a request to connect to the at least one disconnected application session. In some embodiments, a determination is made regarding whether to establish a connection between the client computer and the requested at least one session responsive to an evaluation of a rule. In one of these embodiments, the determination is made responsive to evaluating the rule as described above. In other embodiments, a determination is made to establish a connection between the client computer and the at least one session when the server 106 receives the request. In still other embodiments, a determination is made to establish a connection between the client computer and the at least one session when the client computer 102 determines that the user has selected a representation of the at least one disconnected session. In one of these embodiments, the user selects the representation by interacting with a graphical user interface provided with, or incorporated into, the representation. In yet other embodiments, the at least one disconnected session was previously connected to a client computer 102a. In one of these embodiments, the request for the connection to the at least one disconnected session comes from a client computer 102b. In another of these embodiments, the request for the connection to the at least one disconnected session comes from a client computer 102a.

In one embodiment, the server process 222 receives the request to connect to the at least one disconnected session when a user of the client computer selects a graphical representation of the at least one disconnected application session. The server process 222 connects the client 102 to the requested at least one disconnected application session enumerated in the data store 226. In one embodiment, the server process 222 connects the client 102 to the at least one application session responsive to a rule permitting the connection. In another embodiment, the server process 222 establishes the connection between the client 102 and the at least one application session 218 responsive to a rule stored in a rules source 228 as described above.

A connection is established between a client computer operated by the user and the requested at least one disconnected session (step 248, FIG. 2C). In some embodiments, a client computer 102 may be connected to both disconnected and active sessions associated with a user. In other embodiments, upon establishment of the connection, the output transmitter 224 begins transmitting output data generated in the connected session to the client computer.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for displaying and activating disconnected application sessions, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for displaying and activating disconnected sessions, the method comprising the steps of:
    (a) receiving information associated with a user;
    (b) identifying at least one disconnected session already associated with the user in response to the information, each of the at least one disconnected session comprising a disconnected application session;
    (c) displaying, to the user, a graphical representation of the at least one disconnected session associated with the user;
    (d) polling a server executing the at least one disconnected session associated with the user for an identification of a change in the at least one disconnected session associated with the user;
    (e) receiving from the server an identification of a change in the at least one disconnected session associated with the user;
    (f) updating, responsive to receiving the identification of the change, the graphical representation of the at least one disconnected session;
    (g) displaying, to the user, the updated graphical representation;
    (h) receiving, from the user, a request to connect to the at least one disconnected session; and
    (i) establishing a connection between a client computer operated by the user and the requested at least one disconnected session.

2. The method of claim 1, wherein step (b) further comprises identifying at least one disconnected desktop session already associated with the user in response to the information.

3. The method of claim 1, wherein step (b) further comprises identifying the at least one disconnected session responsive to querying a data store enumerating sessions.

4. The method of claim 1, wherein step (b) further comprises consulting stored data associated with a plurality of servers executing sessions.

5. The method of claim 1, wherein step (b) further comprises identifying a first session executing on a first server.

6. The method of claim 5, wherein step (b) further comprises identifying a second session executing on the first server.

7. The method of claim 6, wherein step (b) further comprises identifying at least one of the first session and the second session as a disconnected session.

8. The method of claim 5, wherein step (b) further comprises identifying a second session executing on a second server.

9. The method of claim 8, wherein step (b) further comprises identifying at least one of the first session and the second session as a disconnected session.

10. The method of claim 1, wherein step (c) further comprises displaying, to the user, a graphical representation of the at least one disconnected session associated with the user, the graphical representation comprising a user interface element.

11. The method of claim 1, wherein step (c) further comprises displaying, to the user, a graphical representation of the at least one disconnected session associated with the user, the graphical representation displaying, to the user, output data generated by the at least one disconnected session.

12. The method of claim 1, wherein step (c) further comprises the step of transmitting output data generated by the at least one disconnected session.

13. The method of claim 1, wherein step (c) further comprises displaying the transmitted output data in the graphical representation.

14. The method of claim 1, wherein step (d) further comprises the step of receiving a request for an identification of a change in the at least one disconnected session associated with the user.

15. The method of claim 1, wherein step (c) comprises displaying, to the user, a representation of a state of the at least one disconnected session associated with the user.

16. The method of claim 1, wherein step (c) comprises the step of displaying, to the user, a description of a state of the at least one disconnected session associated with the user.

17. The method of claim 1, wherein step (c) comprises the step of displaying, to the user, a text-based description of a state of the at least one disconnected session associated with the user.

18. The method of claim 1, wherein step (c) further comprises displaying, via a web browser, to the user, the graphical representation of the at least one disconnected session associated with the user.

19. The method of claim 1 further comprising the step of determining whether to establish a connection between the client computer and the requested at least one disconnected session responsive to an evaluation of a rule.

20. The method of claim 19, wherein the rule is created by the user.

21. The method of claim 19, wherein the rule is created by an administrator.

22. The method of claim 1, wherein step (h) further comprises determining to establish a connection between the client computer and the at least one disconnected session upon receiving a selection of the graphical representation by the user.

23. The method of claim 1 further comprising the steps of:
receiving a request to disconnect at least one session associated with the user; and
disconnecting the at least one session from the client computer.

24. The method of claim 23 further comprising the step of updating at least one data record associated with the at least one session to indicate that the at least one session is disconnected.

25. The method of claim 23 further comprising the step of continuing execution of an application in the at least one disconnected session.

26. The method of claim 1 further comprising the step of authenticating the user in response to the received authentication information.

27. The method of claim 1, wherein the at least one session was previously disconnected from a first client computer.

28. The method of claim 27, wherein step (i) further comprises establishing a connection between the at least one previously disconnected session and a second client computer.

29. A server for displaying and activating disconnected sessions, the server comprising:
a network module receiving information associated with a user of a client computer;
a data store enumerating at least one disconnected session associated with the user, each of the at least one disconnected session comprising a disconnected application session; and
a server process executing on the server to:
transmit to the client computer, a graphical representation of the at least one disconnected session associated with the user,
poll a server executing the at least one disconnected session associated with the user for an identification of a change in the at least one disconnected session associated with the user,
receive an identification of a change in the at least one disconnected session associated with the user,
update, responsive to receiving the identification of the change, the graphical representation of the at least one disconnected session,
display, to the user, the updated graphical representation,
receive a request to connect to the at least one disconnected session, and
connect the client computer to the requested at least one disconnected session enumerated in the data store.

30. The server of claim 29, wherein the server process further comprises means for connecting the client to the at least one disconnected session subject to a rule permitting the client computer operated by the user to connect to the at least one session.

31. The server of claim 30, wherein the rule is created by the user.

32. The server of claim 30, wherein the rule is created by an administrator.

33. The server of claim 29, wherein the server process further comprises means for connecting the client computer to the at least one disconnected session responsive to receiving a selection of the graphical representation.

34. The server of claim 29, wherein the server process further comprises means for querying the data store to identify the at least one disconnected session.

35. The server of claim 29, wherein the server process further comprises means for disconnecting the client computer from at least one session.

36. The server of claim 35, wherein the server process further comprises means for continuing execution of an application in the disconnected at least one session.

37. The server of claim 29, further comprising an authentication module for authenticating the user in response to the received information.

38. The server of claim 29, wherein the data store comprises stored data associated with a plurality of servers executing sessions.

39. The server of claim 29, wherein the server process further comprises means for transmitting output data generated by an executing, disconnected session to a client computer.

40. The server of claim 29, wherein the server process further comprises means for transmitting a graphical representation of at least one disconnected session, the graphical representation displaying a representation of output data generated by an executing, disconnected session to a client computer.

41. The server of claim 29, wherein the server process further comprises means for transmitting, to the client computer, a graphical representation of the at least one session associated with the user, the graphical representation comprising a user interface element.

42. The server of claim 29, wherein the server process further comprises means for transmitting, to the client computer, a representation of a state of the at least one disconnected session associated with the user.

43. The server of claim 29, wherein the server process further comprises means for transmitting, to the client computer, a description of a state of the at least one disconnected session associated with the user.

44. The server of claim 29, wherein the server process further comprises means for transmitting, to the client computer, a text-based description of a state of the at least one disconnected session associated with the user.

45. The server of claim 29, wherein the server process further comprises means for identifying a first session executing on a first server.

46. The server of claim 45, wherein the server process further comprises means for identifying a second session executing on the first server.

47. The server of claim 46, wherein the server process further comprises means for identifying at least one of the first session and the second session as a disconnected session.

48. The server of claim 45, wherein the server process further comprises means for identifying a second session executing on a second server.

49. The server of claim 48, wherein the server process further comprises means for identifying at least one of the first session and the second session as a disconnected session.

* * * * *